United States Patent
Yamamoto

(10) Patent No.: US 6,927,805 B2
(45) Date of Patent: Aug. 9, 2005

(54) COMPACTLY-DESIGNED TELEVISION RECEIVER

(75) Inventor: Masaki Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 532 days.

(21) Appl. No.: 10/157,405

(22) Filed: May 29, 2002

(65) Prior Publication Data

US 2002/0191118 A1 Dec. 19, 2002

(30) Foreign Application Priority Data

May 31, 2001 (JP) ........................................ 2001-165801

(51) Int. Cl.[7] .................................................. H04N 5/46
(52) U.S. Cl. ...................................... 348/729; 348/736
(58) Field of Search ................................. 348/729, 736, 348/737, 731, 725, 726; 455/188.1, 191.1, 191.2; H04N 5/46

(56) References Cited

U.S. PATENT DOCUMENTS

| | | | | |
|---|---|---|---|---|
| 4,639,786 A | * | 1/1987 | Tamer et al. | 348/737 |
| 4,660,087 A | * | 4/1987 | Rumreich | 348/737 |
| 5,285,179 A | * | 2/1994 | Wignot et al. | 334/15 |
| 6,795,128 B2 | * | 9/2004 | Yamamoto | 348/729 |

FOREIGN PATENT DOCUMENTS

| | | |
|---|---|---|
| JP | 6-224797 | 8/1994 |
| JP | 2002-64757 | 2/2002 |

* cited by examiner

Primary Examiner—Michael H. Lee
(74) Attorney, Agent, or Firm—Brinks Hofer Gilson & Lione

(57) ABSTRACT

A television receiver intended to decrease the number of expensive SAW filters to achieve low cost and a compact design. A trap circuit is interposed between a mixer and a SAW filter. During reception of a television signal, one of the trap frequencies at which the trap circuit responds is set to a video intermediate frequency on a television channel adjoining above an intermediate frequency band or a nearby frequency. The other trap frequency is set to a sound intermediate frequency on the adjoining television channel or a nearby frequency. During reception of an FM broadcast signal, the frequency of the FM broadcast signal is converted into a color subcarrier frequency on the intermediate frequency band or a nearby frequency. One of the trap frequencies is set to a substantially middle frequency between the video intermediate frequency and color subcarrier frequency on the intermediate frequency band.

6 Claims, 4 Drawing Sheets

COMPACTLY-DESIGNED TELEVISION RECEIVER

BACKGROUND OF THE INVENTION

1. Field of the Invention

The present invention relates to a television receiver capable of receiving a television signal or a frequency-modulation (FM) broadcast signal.

2. Description of the Related Art

FIG. 8 shows the circuitry of a conventional television receiver. A tuning circuit and an amplifier that are not shown are deposited in stages preceding a mixer 31. A television signal or a FM broadcast signal selected by the tuning circuit is applied to the mixer 31. The mixer 31 uses a local-oscillator signal sent from a local oscillator 32 to convert the frequency of the television signal into an intermediate frequency band (ranging from 54 MHz to 60 MHz under the Japanese specifications for channels). Moreover, the frequency of the FM broadcast signal is converted into a sound intermediate frequency or a nearby frequency on the intermediate frequency band. The frequency-converted television signal or FM broadcast signal is applied to a first intermediate-frequency tuning circuit 33.

The first intermediate-frequency tuning circuit 33 is realized with a parallel tuning circuit. During reception of a television signal, the first intermediate-frequency tuning circuit 33 is tuned to a frequency between a video intermediate frequency and a color subcarrier frequency on the intermediate frequency band. During reception of a FM broadcast signal, the first intermediate-frequency tuning circuit 33 is tuned to the sound intermediate frequency or a nearby frequency. Switching the frequencies to which the first intermediate-frequency tuning circuit is tuned is controlled using a switching transistor 34. The switching transistor 34 has the emitter thereof grounded. A supply voltage B is applied to the collector of the switching transistor 34 via a pull-up resistor 35. The collector of the switching transistor 34 is connected to a control terminal 33a of the first intermediate-frequency tuning circuit 33. A high-level or low-level switching voltage S is applied to the base of the switching transistor 34.

The television signal or FM broadcast signal having passed through the first intermediate-frequency tuning circuit 33 is amplified by an intermediate-frequency amplifier 36 deposited in a subsequent stage. Thereafter, the resultant signal is applied to a second intermediate-frequency tuning circuit 37. The second intermediate-frequency tuning circuit 37 consists mainly of a series circuit composed of a first capacitive element 37a, a first inductive element 37b, and a second capacitive element 37c one of whose terminals is grounded, and a switching diode 37d connected in parallel with the first capacitive element 7a. The anode of the switching diode 37d is connected to the output terminal of the intermediate-frequency amplifier 36. A bias voltage produced by the intermediate-frequency amplifier 36 is applied to the anode of the switching diode 37d. Moreover, a node between the first inductive element 37b and a second capacitive element 37c is connected to the collector of the switching transistor 34.

In the second intermediate-frequency tuning circuit 37, a resonant frequency at which a circuit composed of the first capacitive element 37a, first inductive element 37b, and second capacitive element 37c becomes resonant with the switching diode 37d brought to non-conduction is set to a frequency between the video intermediate frequency and color subcarrier frequency on the intermediate frequency band. A resonant frequency at which a circuit composed of the first inductive element 37b and second capacitive element 37c becomes resonant with the switching diode 37d brought to conduction is set to the sound intermediate frequency on the intermediate frequency band or a nearby.

A first surface acoustic wave (SAW) filter 38 is connected to the node between the first inductive element 37b and second capacitive element 37c. Moreover, a second SAW filter 40 is connected to the node via a second inductive element 39. The second inductive element 39 is used to make the coupling between the first SAW filter 38 and second SAW filter 40 coarse, and offers a relatively large inductance (4.7 $\mu$H).

The first SAW filter 38 exhibits a bandpass response characteristic. Namely, the first SAW filter 38 substantially uniformly passes signal components whose frequencies lie between the video intermediate frequency and color subcarrier frequency on the intermediate frequency band, and attenuates a signal component of the sound intermediate frequency as largely as at about 20 dB. Moreover, the second SAW filter 40 has the characteristic of passing signal components whose frequencies fall within a narrow band so that the second SAW filter 40 will pass a signal component of the sound intermediate frequency or a nearby frequency so as to avoid interference with a FM broadcast signal on an adjoining channel.

A video intermediate-frequency circuit 41 is connected to the output terminal of the first SAW filter 38, and a video detection circuit (not shown) is disposed in a subsequent stage. Moreover, a sound intermediate-frequency circuit 42 is connected to the output terminal of the second SAW filter 40, and a sound detection circuit (not shown) is disposed in a subsequent stage.

In the foregoing circuitry, during reception of a television signal, the switching transistor 34 and switching diode 37d are brought to conduction. The first intermediate-frequency tuning circuit 33 and second intermediate-frequency tuning circuit 37 are tuned to a frequency between the video intermediate frequency and color subcarrier frequency on the intermediate frequency band. Consequently, the frequency-converted television signal is transferred via the first SAW filter 38 and video intermediate-frequency circuit 41.

During reception of a FM broadcast signal, the switching transistor 34 and switching diode 37d are brought to conduction. The first intermediate-frequency tuning circuit 33 and second intermediate-frequency tuning circuit 37 are tuned to the sound intermediate frequency on the intermediate frequency band or a nearby frequency. Consequently, the frequency-converted FM broadcast signal is transferred via the second SAW filter 40 and sound intermediate-frequency circuit 42.

In the aforesaid conventional television receiver, the frequency of a received FM broadcast signal is converted into the sound intermediate frequency on the intermediate frequency band or a nearby frequency. In order to avoid interference with a FM broadcast signal on an adjoining channel, the second SAW filter 40 is included to pass only the FM broadcast signal that should be received. Therefore, the television receiver has the drawback of high cost.

In order to prevent the level of a television signal applied to the first SAW filter 38 from dropping because of the presence of the second SAW filter 40, the second inductive element 39 offering a relatively large inductance is included for making the coupling between the first SAW filter 38 and second SAW filter 40 coarse. This is disadvantageous in terms of a compact design.

SUMMARY OF THE INVENTION

Accordingly, an object of the present invention is to reduce the number of expensive SAW filters to achieve low cost and a compact design.

According to the present invention, there is provided a television receiver consisting mainly of a mixer, a SAW filter, and a trap circuit. The mixer converts the frequency of a television signal or a FM broadcast signal into an intermediate frequency on an intermediate frequency band. The SAW filter passes a signal on the intermediate frequency band but attenuates a signal component of a sound intermediate frequency on the intermediate frequency band. The trap circuit responds at two trap frequencies that can be switched, and is interposed between the mixer and SAW filter. During reception of the television signal, one of the trap frequencies is set to a video intermediate frequency on another television channel adjoining above the intermediate frequency band or a nearby frequency. The other trap frequency is set to a sound intermediate frequency on the adjoining channel or a nearby frequency. During reception of the FM broadcast signal, the frequency of the FM broadcast signal is converted into a color subcarrier frequency on the intermediate frequency band or a nearby frequency. Moreover, one of the trap frequencies is set to a substantially middle frequency between the video intermediate frequency and color subcarrier frequency on the intermediate frequency band or a nearby frequency. The other trap frequency is set to the video intermediate frequency on the intermediate frequency band or a nearby frequency. The frequency-converted television signal or FM broadcast signal is transferred from the SAW filter.

Moreover, a video intermediate-frequency circuit is included for processing the frequency-converted television signal, and a sound intermediate-frequency circuit is included for processing the frequency-converted FM broadcast signal. The video intermediate-frequency circuit is connected to the output terminal of the SAW filter, and the sound intermediate-frequency circuit is connected to the output terminal of the SAW filter with a first switching diode between them. The first switching diode is brought to non-conduction during reception of the television signal, and brought to conduction during reception of the FM broadcast signal.

Moreover, the trap circuit is composed of a parallel resonant circuit that is interposed between the mixer and the SAW filter, and a series resonant circuit that is connected between the parallel resonant circuit and a ground. During reception of the television signal, the resonant frequency of the parallel resonant circuit is set to the video intermediate frequency on the adjoining television channel or a nearby frequency. Moreover, the resonant frequency of the series resonant circuit is set to the sound intermediate frequency on the adjoining channel or a nearby frequency. During reception of the FM broadcast signal, the resonant frequency of the parallel resonant circuit is set to the video intermediate frequency on the intermediate frequency band or a nearby frequency. Moreover, the resonant frequency of the series resonant circuit is set to a nearly middle frequency between the color subcarrier frequency and video intermediate frequency on the intermediate frequency band.

Moreover, the parallel resonant circuit consists of a parallel circuit composed of a second switching diode and a first capacitive element, a first inductive element connected in series with the parallel circuit, and a second capacitive element connected in parallel to the whole of the parallel circuit and first inductive element. The series resonance circuit consists of a varactor diode and a second inductive element that are connected in series with each other. The anode of the varactor diode is dc-coupled to a ground. During reception of the television signal, a high-level voltage is applied to the cathodes of the second switching diode and varactor diode in order to bring the second switching diode to conduction. During reception of the FM broadcast signal, a low-level voltage is applied to the cathodes of the second switching diode and varactor diode in order to bring the second switching diode to non-conduction.

Moreover, the output terminal of the parallel resonant circuit is grounded via a third capacitive element. A resonant frequency at which series circuit composed of the first capacitive element, first inductive element, and third capacitive element which becomes resonant with the second switching diode brought to non-conduction is set to a frequency between the video intermediate frequency and color subcarrier frequency on the intermediate frequency band. A resonant frequency at which a series resonant circuit composed of the first inductive element and third capacitive element becomes resonant with the second switching diode brought to conduction is set to the color subcarrier frequency or a nearby frequency.

Moreover, the cathode of the varactor diode is grounded via a first resistor, and the cathode and anode thereof are connected with a second resistor between them.

DESCRIPTION OF THE PREFERRED EMBODIMENTS

Figure 1:
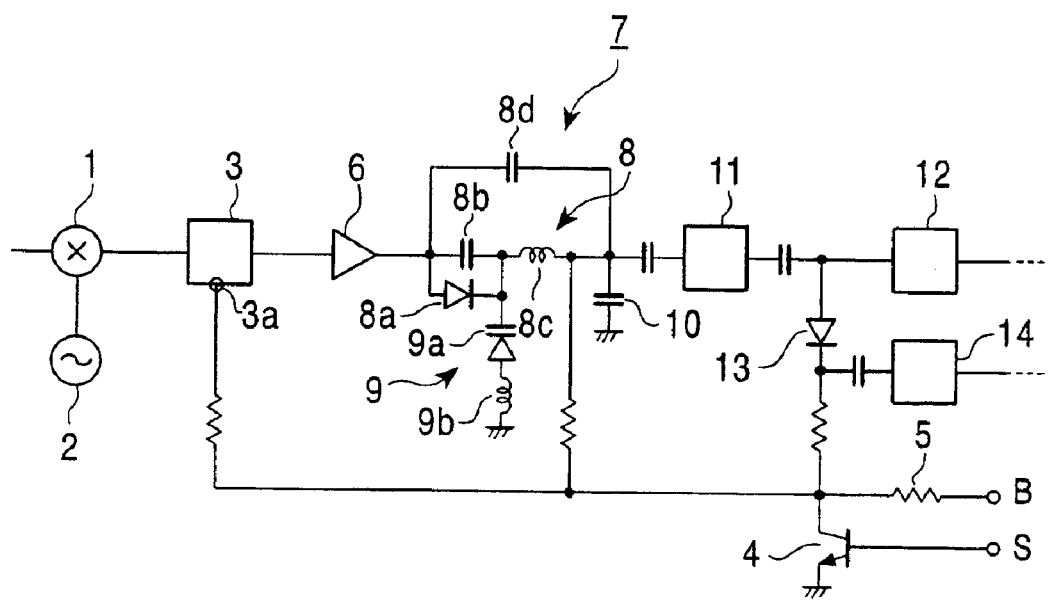
FIG. 1 is a circuit diagram showing the configuration of a television receiver in accordance with the present invention.

A television receiver in accordance with the present invention will be described in conjunction with the drawings below. FIG. 1 shows the circuitry of a major portion of the television receiver in accordance with the present invention. FIG. 2 to FIG. 6 are characteristic curves indicating selectivity. FIG. 7 is a circuit diagram showing another circuitry of a trap circuit employed in the present invention.

Referring to FIG. 1, a tuning circuit and an amplifier are disposed in a stage preceding a mixer 1, through they are not shown. A television signal or a FM broadcast signal amplified by the amplifier is applied to the mixer 1. The mixer 1 uses a local-oscillator signal sent from a local oscillator 2 to convert the television signal into an intermediate frequency band (a band from 54 MHz to 60 MHz under the Japanese specifications for channels). Moreover, the FM broadcast signal received is converted into a color subcarrier frequency (55.17 MH under the Japanese specifications for channels)on the intermediate frequency band. The frequency-converted television signal or FM broadcast signal is applied to an intermediate-frequency tuning circuit 3.

The intermediate-frequency tuning circuit 3 is realized with a parallel tuning circuit. During reception of the television signal, the intermediate-frequency tuning circuit 3 is tuned to a frequency between a video intermediate frequency and a color subcarrier frequency on the intermediate frequency band. During reception of the FM broadcast signal, the intermediate-frequency tuning circuit 3 is tuned to the color subcarrier frequency or a nearby frequency. Switching the frequencies to which the intermediate-frequency tuning circuit 3 is tuned is controlled using a switching transistor 4. The emitter of the switching transistor 4 is grounded. A supply voltage B is applied to the collector of the switching transistor 4 via a pull-up resistor 5, and the collector is connected to a control terminal 3a of the intermediate-frequency tuning circuit 3. A high-level or low-level switching voltage S is applied to the base of the switching transistor 4.

The television signal or FM broadcast signal having passed through the intermediate-frequency tuning circuit 3 is amplified by an intermediate-frequency amplifier 6 in a subsequent stage, and then applied to a trap circuit 7.

The trap circuit 7 includes a parallel resonant circuit 8 and a series resonant circuit 9. The resonant frequencies of the parallel and series resonant circuits 8 and 9 are regarded as trap frequencies at which the trap circuit 7 responds to attenuate undesired signal components. The parallel resonant circuit 8 consists of a parallel circuit composed of a second switching diode 8a and a first capacitive element 8b, a first inductive element 8c connected in series with the parallel circuit, and a second capacitive element 8d connected in parallel with the whole of the parallel circuit and first inductive element 8c. The resonant frequency of the parallel resonant circuit 8 varies depending on whether the second switching diode 8a is brought to conduction or non-conduction. One of the terminals of the second switching diode 8a, that is, the anode thereof is connected to the output terminal of the intermediate-frequency amplifier 6. A bias voltage produced by the intermediate-frequency amplifier 6 is applied to the anode of the second switching diode 8a. The other terminal of the second switching diode 8a is grounded via a third capacitive element 10 and connected to a surface acoustic wave (SAW) filter 11.

Moreover, the series resonant circuit 9 is realized with a series circuit composed of a varactor diode 9a and a second inductive element 9b one of whose terminals is grounded. The varactor diode 9a and second inductive element 9b are connected in series with each other. The cathode of the varactor diode 9a is connected to the cathode of the second switching diode 8a. The resonant frequency of the series resonant circuit 9 varies depending on a voltage at the cathode of the varactor diode 9a. The cathodes of the second switching diode 8a and varactor diode 9a are connected to the collector of a switching transistor 4 via a first inductive element 8c.

The SAW filter 11 exhibits a bandpass response characteristic. Namely, the SAW filter 11 uniformly passes signal components whose frequencies lie between a video intermediate frequency P and a color subcarrier frequency C on the intermediate frequency band, and attenuates a signal component of a sound intermediate frequency S as large as about 20 dB. Moreover, a video intermediate-frequency circuit 12 is connected to the output terminal of the SAW filter 11, and a video detection circuit (not shown) is deposited in a subsequent stage. Furthermore, a sound intermediate-frequency circuit 14 is connected to the output terminal of the SAW filer 11 via a first switching diode 13, and a sound detection circuit (not shown) is deposited in a subsequent stage. A bias voltage produced by the video intermediate-frequency circuit 12 is applied to the anode of the first switching diode 13. The cathode of the first switching diode 13 is connected to the collector of the switching transistor 4.

In the foregoing circuitry, during reception of a television signal, a low-level switching voltage is applied to the base of the switching transistor 4. This brings the switching transistor 4 to non-conduction. As mentioned above, the intermediate-frequency tuning circuit 3 is tuned to a frequency between the video intermediate frequency P and color subcarrier frequency C on the intermediate frequency band. Moreover, the second switching diode 8a is also brought to non-conduction. At this time, the resonant frequency of the parallel resonant circuit 8 is set to a video intermediate frequency P-1 on a television channel adjoining above the intermediate frequency band or a nearby frequency. Furthermore, the resonant frequency of a series circuit composed of the first capacitive element 8b, first inductive element 8c, and third capacitive element 10 is set to a frequency between the video intermediate frequency P and color subcarrier frequency C on the intermediate frequency band.

Figure 3:
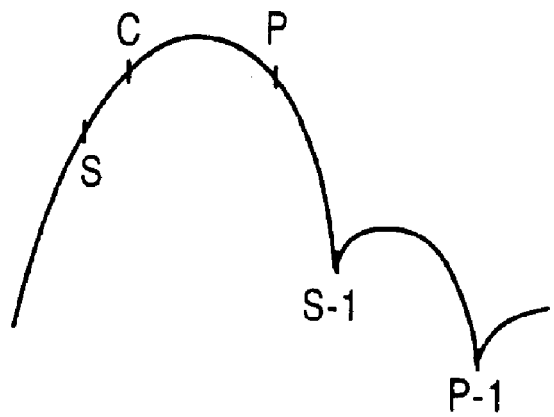
FIG. 3 is a characteristic curve indicating the selectivity offered by an intermediate-frequency tuning circuit and a trap circuit, which are included in the television receiver in accordance with the present invention, during reception of a television signal.

Moreover, since a supply voltage is also applied to the cathode of the varactor diode 9a, the capacitance offered by the series resonant circuit 9 is small. The resonant frequency of the series resonant circuit 9 is set to a sound intermediate frequency S-1 the television channel adjoining above the intermediate frequency band or a nearby frequency. Therefore, the selectivity offered by the intermediate-frequency tuning circuit 3, trap circuit 7, and third capacitive element 10 brings about, as shown in FIG. 3, attenuation of a signal component of the video intermediate frequency P-1 on the television channel adjoining the intermediate frequency band or a nearby frequency and a signal component of the sound intermediate frequency S-1 or a nearby frequency.

Figure 2:
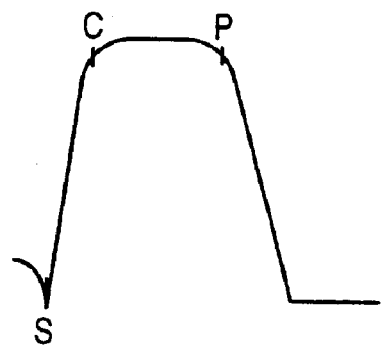
FIG. 2 is a characteristic curve indicating the selectivity of a SAW filter adapted to the television receiver in accordance with the present invention.
Figure 4:
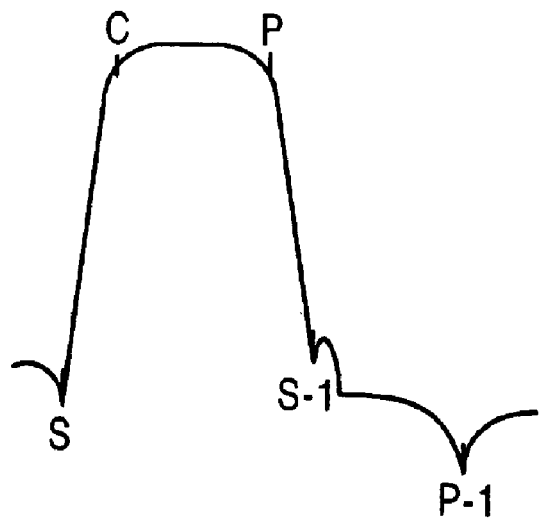
FIG. 4 is a characteristic curve indicating overall selectivity offered by a major portion of the television receiver in accordance with the present invention during reception of a television signal.

FIG. 2 shows the selectivity exhibited by the SAW filter 11. The selectivity exhibited by the television receiver brings about, as shown in FIG. 4, attenuation of the components of the signal, which has been transmitted on the adjoining channel and of which intermediate frequency is higher, having the video intermediate frequency P-1 or a nearby frequency and the sound intermediate frequency S-1 or a nearby frequency. Owing to the selectivity, the received television signal is transferred from the SAW filter 11.

Moreover, during reception of a television signal, the first switching diode 13 is brought to non-conduction. The sound intermediate-frequency circuit 14 is isolated from the video intermediate-frequency circuit. Consequently, the television signal is applied to the video intermediate-frequency circuit 12.

On the other hand, during reception of the FM broadcast signal, a high-level switching voltage is applied to the base of the switching transistor 4. The switching transistor 4 is therefore brought to conduction. The intermediate-frequency tuning circuit 3 is tuned to the color subcarrier frequency C that is part of the intermediate frequency or a nearby frequency. Moreover, the second switching diode 8a is also brought to conduction. At this time, the resonant frequency of the parallel resonant circuit 8 is set to the video intermediate frequency P on the intermediate frequency band or a nearby frequency. Furthermore, a series circuit composed of the first inductive element 8c and the third capacitive element 10 is grounded so that the resonant frequency thereof will be set to the video intermediate frequency P on the intermediate frequency band or a nearby frequency.

Figure 5:
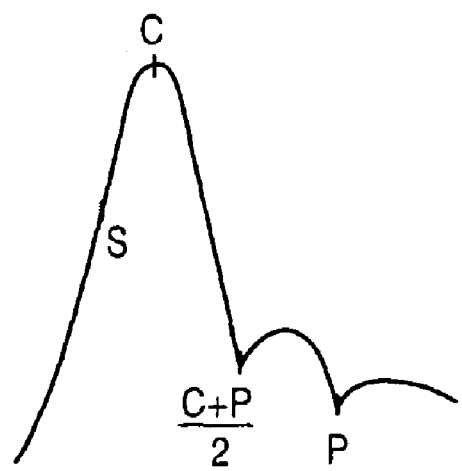
FIG. 5 is a characteristic curve indicating the selectivity offered by the intermediate-frequency tuning circuit and trap circuit, which are included in the television receiver in accordance with the present invention, during reception of a FM broadcast signal.

Moreover, a voltage at the cathode of the varactor diode 9a drops, and the capacitance offered by the series resonant circuit 9 increases. This causes the resonant frequency of the series resonant circuit 9 to shift to a smaller frequency value. Anyhow, the resonant frequency is set to a substantially middle frequency (C+P)/2 between the video intermediate frequency P and color subcarrier frequency C on the intermediate frequency band. Consequently, the selectivity offered by the intermediate-frequency tuning circuit 3, trap circuit 7, and third capacitive element 10 allows, as shown in FIG. 5, a signal component having the color subcarrier frequency C on the intermediate frequency band or a nearby frequency to have a peak level. Moreover, the selectivity brings about attenuation of a signal component having the video intermediate frequency P on the intermediate frequency band or a nearby frequency and a signal component having the substantially middle frequency (C+P)/2 between the video intermediate frequency P and color subcarrier frequency C on the intermediate frequency band.

Figure 6:
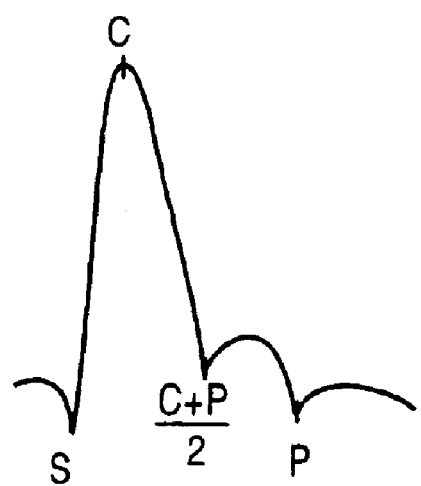
FIG. 6 is a characteristic curve indicating overall selectivity offered by the major portion of a television receiver in accordance with a related art during reception of a FM broadcast signal.
Figure 7:
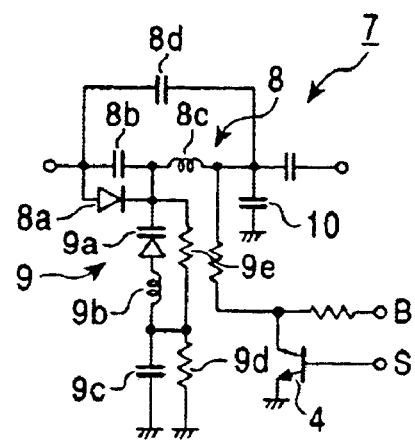
FIG. 7 is a circuit diagram showing another circuitry of the trap circuit employed in the television receiver in accordance with the present invention.
Figure 8:
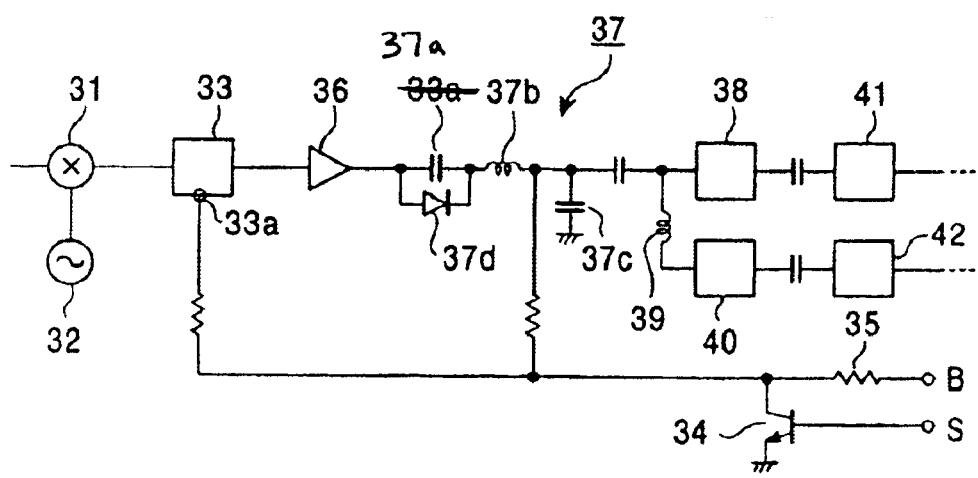
FIG. 8 is a circuit diagram showing the circuitry of a television receiver in accordance with a related art.

FIG. 6 shows overall selectivity reflecting the selectivity of the SAW filter 11. The overall selectivity brings about attenuation of signal components having the sound intermediate frequency S and the video intermediate frequency P on the intermediate frequency band or nearby frequencies, and a signal component having the substantially middle frequency (C+P)/2 between the video intermediate frequency P and color subcarrier frequency C on the intermediate frequency band. The FM broadcast signal having been processed based on the overall sensitivity is transferred from the SAW filter 11, and applied to the sound intermediate-frequency circuit 14 via the switching diode 13.

FIG. 7 shows another circuitry of the trap circuit 7. One of the terminals of the second inductor 9b is grounded via a direct-current (dc) cutting capacitor 9c and a first resistor 9d. A node between the second inductor 9b and dc cutting capacitor 9c is connected to the cathode of the varactor diode 9a via a second resistor 9e. Consequently, the anode of the varactor diode 9a is dc-coupled to a ground via the first resistor 9d. The other circuit elements are identical to those shown in FIG. 1. In this circuitry, even if a supply voltage varies, the variations of voltages at both the terminals of the varactor diode 9a are limited. Moreover, a desired fraction of the voltage at the anode of the varactor diode 9a is provided due to the presence of the first and second resistors 9d and 9e. It is therefore necessary to reset the resonant frequency of the series resonant circuit 9.

Incidentally, the intermediate-frequency tuning circuit 3, SAW filter 11, and video intermediate-frequency circuit 12 may be realized with balanced circuits. Moreover, the intermediate-frequency amplifier 6 may be realized with a balanced input/unbalanced output circuit.

As described so far, a trap circuit is interposed between a mixer and a SAW filter. During reception of a television signal, one of trap frequencies is set to a video intermediate frequency on a television channel adjoining above an intermediate frequency band or a nearby frequency. The other trap frequency is set to a sound intermediate frequency on the adjoining channel or a nearby frequency. During reception of a FM broadcast signal, the frequency of the FM broadcast signal is converted into a color subcarrier frequency on the intermediate frequency band or a nearby frequency. One of the trap frequencies is set to a substantially middle frequency between a video intermediate frequency and a color subcarrier frequency on the intermediate frequency band, and the other trap frequency is set to the video intermediate frequency on the intermediate frequency band or a nearby frequency. The frequency-converted television signal or FM broadcast signal is outputted from the SAW filter. Thus, the single SAW filter is used to receive both the television signal and FM broadcast signal. This contributes to a compact design an low cost.

Moreover, a video intermediate-frequency circuit is connected to the output terminal of the SAW filter, and a sound intermediate-frequency circuit is connected to the output of the SAW filter via a first switching diode. The first switching diode is brought to non-conduction during reception of a television signal, and brought to conduction during reception of a FM broadcast signal. During reception of the television signal, the sound intermediate-frequency circuit can be isolated from the video intermediate-frequency circuit. Therefore, the level of the television signal to be applied to the video intermediate-frequency circuit will not decrease.

Moreover, a parallel resonant circuit and a series resonant circuit are included. During reception of a television signal, the resonant frequency of the parallel resonant circuit is set to a video intermediate frequency on a television channel adjoining an intermediate frequency band or a nearby frequency. The resonant frequency of the series resonant circuit is set to a sound intermediate frequency on the adjoining channel or a nearby frequency. During reception of a FM broadcast signal, the resonant frequency of the parallel resonant circuit is set to a video intermediate frequency on the intermediate frequency band or a nearby frequency. The resonant frequency of the series resonant circuit is set to a substantially middle frequency between a color subcarrier frequency and the video intermediate frequency on the intermediate frequency band. In either case, the resonant frequency of the parallel resonant circuit is higher than that of the series resonant circuit. Consequently, as long as either of the two settings of the resonant frequency of either of the resonant circuits is adopted, the resonant circuit becomes inductive. Any other resonant circuit will not be formed. Therefore, undesired signal components can be attenuated.

Moreover, the parallel resonant circuit consists of a parallel circuit composed of a second switching diode and a first capacitive element, a first inductive element connected in series with the parallel circuit, and a second capacitive element connected in parallel to the whole of the parallel circuit and first inductive element. The series resonant circuit consists of a varactor diode and a second inductive element that are connected in series with each other. The anode of the varactor diode is dc-coupled to a ground. During reception of a television signal, a high-level voltage is applied to the cathodes of the second switching diode and varactor diodes in order to bring the second switching diode to non-conduction. During reception of a FM broadcast signal, a low-level voltage is applied to the cathodes of the second switching diode and varactor diode in order to bring the second switching diode to non-conduction. Thus, the resonant frequency values of either of the resonant circuit can be switched easily.

Moreover, the output terminal of the parallel resonant circuit is grounded via a third capacitive element. A resonant frequency at which a series circuit composed of the first capacitive element, first inductive element, and third capacitive element becomes resonant with the second switching diode brought to non-conduction is set to a frequency between the video intermediate frequency and color subcarrier frequency on the intermediate frequency band. A resonant frequency at which a series circuit composed of the first inductive element and third capacitive element becomes resonant with the second switching diode brought to conduction is set to the color subcarrier frequency or a nearby frequency. Using a trap circuit, frequencies to which a tuning circuit is tuned can be switched between reception of a television signal and reception of a FM broadcast signal.

Moreover, the cathode of the varactor diode is grounded via a first resistor, and the anode and cathode thereof are connected with a second resistor between them. The capacitance offered by the varactor diode hardly vary despite the variations of a supply voltage.

What is claimed is:

1. A television receiver comprising:
   a mixer for converting one of a frequency of a television broadcast signal and a frequency-modulation (FM) broadcast signal into an intermediate frequency band in the television broadcast;
   a surface acoustic wave (SAW) filter for passing a signal on the intermediate frequency band or attenuating a signal component of a sound intermediate frequency on the intermediate frequency band; and
   a trap circuit responding at two trap frequencies that can be switched, wherein:
   during reception of the television signal, one of the trap frequencies is set to a video intermediate frequency on a television channel adjoining above the intermediate frequency band or a nearby frequency, and the other trap frequency is set to a sound intermediate frequency on the adjoining channel or a nearby frequency;
   during reception of the FM broadcast signal, the frequency of the FM broadcast signal is converted into a color subcarrier frequency on the intermediate frequency band or a nearby frequency, one of the trap frequencies is set to a substantially middle frequency between the video intermediate frequency and the color subcarrier frequency on the intermediate frequency band, and the other trap frequency is set to the video intermediate frequency on the intermediate frequency band or a nearby frequency; and
   a frequency-converted television signal or FM broadcast signal is outputted from said SAW filter.

2. A television receiver according to claim 1, further comprising:
   a video intermediate-frequency circuit for processing the frequency-converted television signal; and
   a sound intermediate-frequency circuit for processing the frequency-converted FM broadcast signal, wherein:
   said video intermediate-frequency circuit is connected to the output terminal of said SAW filter, and said sound intermediate-frequency circuit is connected to the output of said SAW filter via a first switching diode; and
   said first switching diode is brought to non-conduction during reception of the television signal, and brought to conduction during reception of the FM broadcast signal.

3. A television receiver according to claim 1, wherein:
   said trap circuit comprises a parallel resonant circuit interposed between said mixer and said SAW filter, and a series resonant circuit connected between said parallel resonant circuit and a ground;
   during reception of the television signal, a resonant frequency of said parallel resonant circuit is set to the video intermediate frequency on the adjoining channel or a nearby frequency, and the resonance frequency of said series resonant circuit is set to the sound intermediate frequency on the adjoining channel or a nearby frequency; and
   during reception of the FM broadcast signal, the resonant frequency of said parallel resonant circuit is set to the video intermediate frequency on the intermediate frequency band or a nearby frequency, and the resonant frequency of said series resonant circuit is set to a substantially middle frequency between the color subcarrier frequency and video intermediate frequency on the intermediate frequency band.

4. A television receiver according to claim 3, wherein:
   said parallel resonant circuit comprises a parallel circuit composed of a second switching diode and a first capacitive element, a first inductive element connected in series with said parallel circuit, and a second capacitive element connected in parallel to the whole of said parallel circuit and said first inductive element;
   said series resonant circuit comprises a varactor diode and a second inductive element that are connected in series with each other, and an anode of said varactor diode is dc-coupled to a ground;
   during reception of the television signal, a high-level voltage is applied to the cathodes of said second switching diode and said varactor diode in order to bring said second switching diode to conduction; and
   during reception of the FM broadcast signal, a low-level voltage is applied to the cathodes of said second switching diode and said varactor diode in order to bring said second switching diode to non-conduction.

5. A television receiver according to claim 4, wherein:
   the output terminal of said parallel resonant circuit is grounded via a third capacitive element;
   a resonant frequency at which a series circuit composed of said first capacitive element, said first inductive element, and said third capacitive element which becomes resonant with said second switching diode brought to non-conduction, is set to a frequency between the video intermediate frequency and color subcarrier frequency on the intermediate frequency band; and
   a resonant frequency at which a series circuit composed of said first inductive element and said third capacitive element becomes resonant with the second switching diode brought to conduction is set to the color subcarrier frequency or a nearby frequency.

6. A television receiver according to claim 4, wherein the cathode of said varactor diode is grounded via a first resistor, and the cathode and anode thereof are connected with a second resistor between them.

* * * * *